United States Patent [19]

Ishida et al.

[11] Patent Number: 5,331,620
[45] Date of Patent: Jul. 19, 1994

[54] RECORDING METHOD AND RECORDING APPARATUS FOR OPTICAL DISK

[75] Inventors: Takashi Ishida, Osaka; Shunji O'Hara, Higashiosaka; Kenzo Ishibashi, Moriguchi; Tadashige Furutani, Kadoma, all of Japan

[73] Assignee: Matsushita Electric Industrial Co., Ltd., Osaka, Japan

[21] Appl. No.: 118,353

[22] Filed: Sep. 9, 1993

Related U.S. Application Data

[63] Continuation of Ser. No. 651,618, Feb. 6, 1991, abandoned.

[30] Foreign Application Priority Data

Feb. 9, 1990 [JP] Japan .................. 2-30841

[51] Int. Cl.$^5$ .................. G11B 7/00; G11B 5/09
[52] U.S. Cl. .................. 369/59; 360/40; 360/51
[58] Field of Search .......... 369/59, 50; 341/59; 360/40, 48, 51

[56] References Cited

U.S. PATENT DOCUMENTS

| | | | |
|---|---|---|---|
| 4,539,667 | 9/1985 | Fujiie | 369/50 |
| 4,685,098 | 8/1987 | Yoshida | 369/59 |
| 4,697,167 | 9/1987 | O'Keeffe et al. | 341/59 |

OTHER PUBLICATIONS

IBM Technical Disclosure Bulletin, vol. 32, No. 8B, Jan. 1990.

*Primary Examiner*—Aristotelis Psitos
*Assistant Examiner*—Duncan Wilkinson
*Attorney, Agent, or Firm*—Wenderoth, Lind & Ponack

[57] ABSTRACT

A recording method and apparatus for an optical disk employs a data format having a fixed pattern sync portion in which a minimum run length of zeros and a maximum run length of zeros are not adjacent to each other. As such, temperature difference caused during recording the optical disk may be made smaller thermal stress applied upon the medium may be reduced, the deterioration thereof may be restrained, and the repetitive frequency of the medium may be improved.

8 Claims, 10 Drawing Sheets

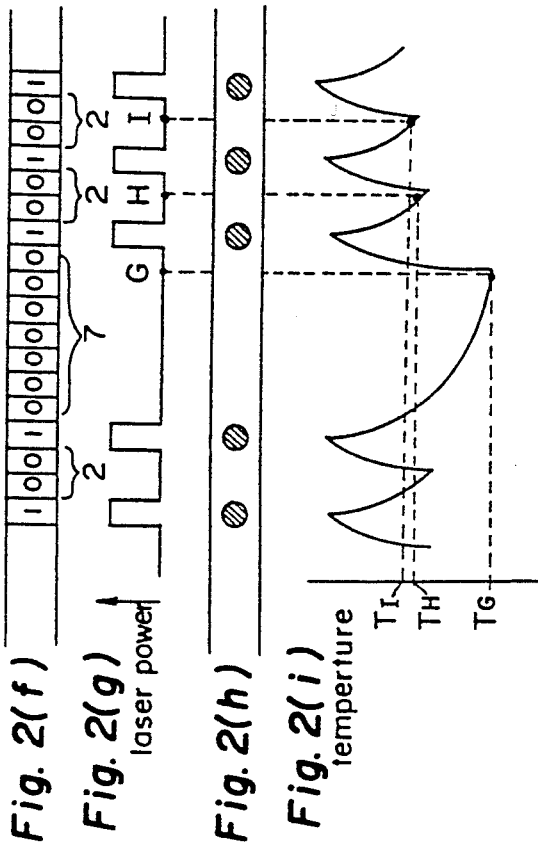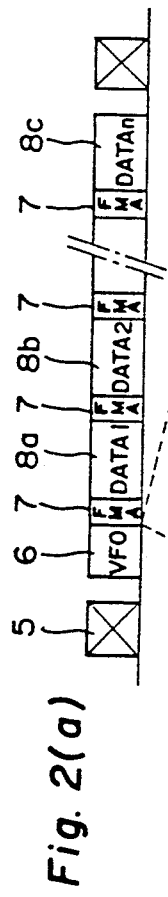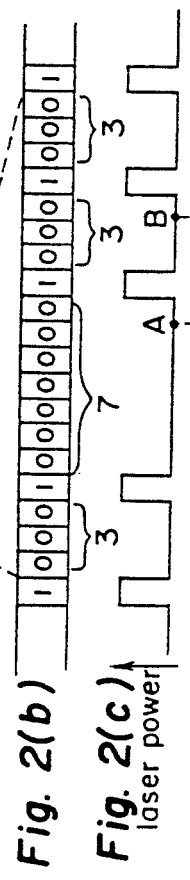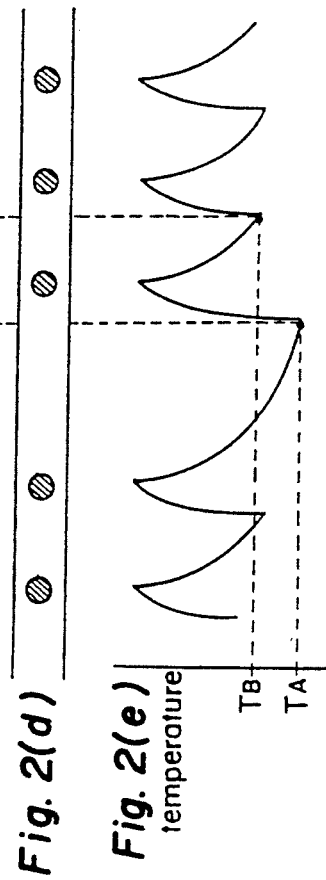

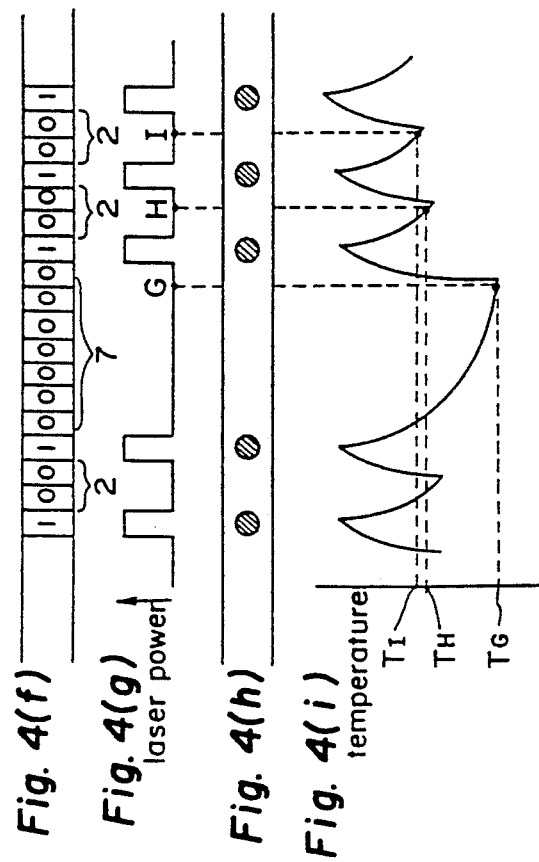
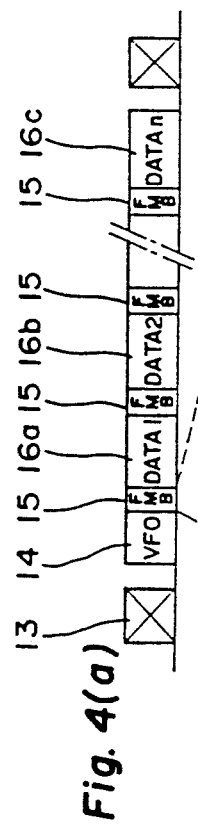
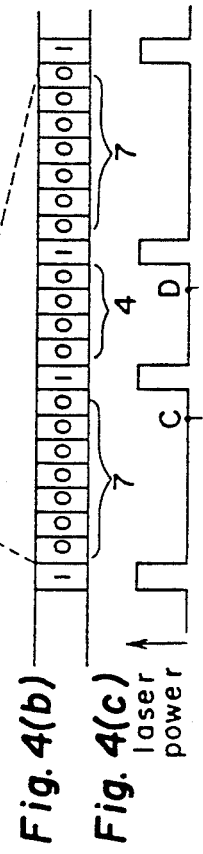
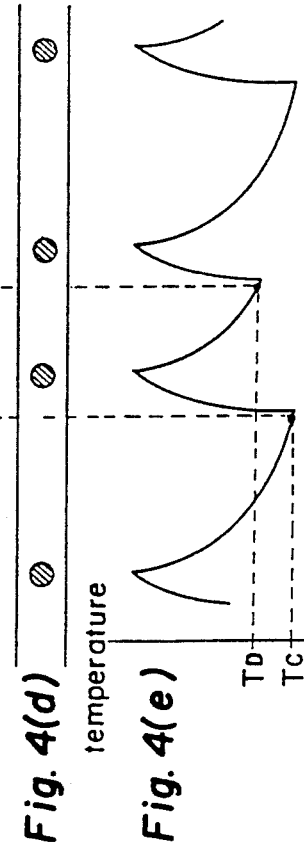
Fig. 4(a)
Fig. 4(b)
Fig. 4(c) laser power
Fig. 4(d) temperature
Fig. 4(e)
$(T_D - T_C) < (T_H - T_G)$
Fig. 4(f)
Fig. 4(g) laser power
Fig. 4(h)
Fig. 4(i) temperature

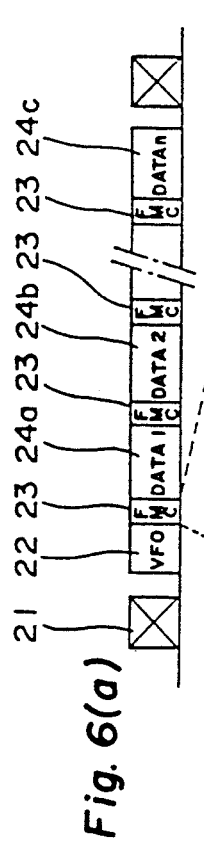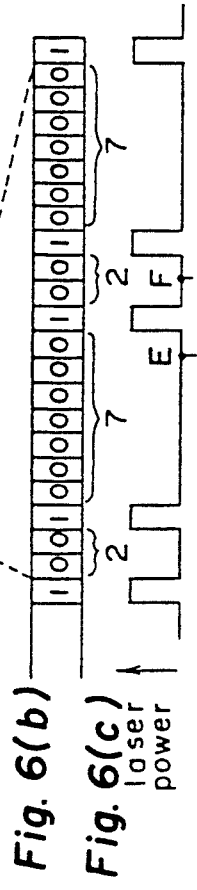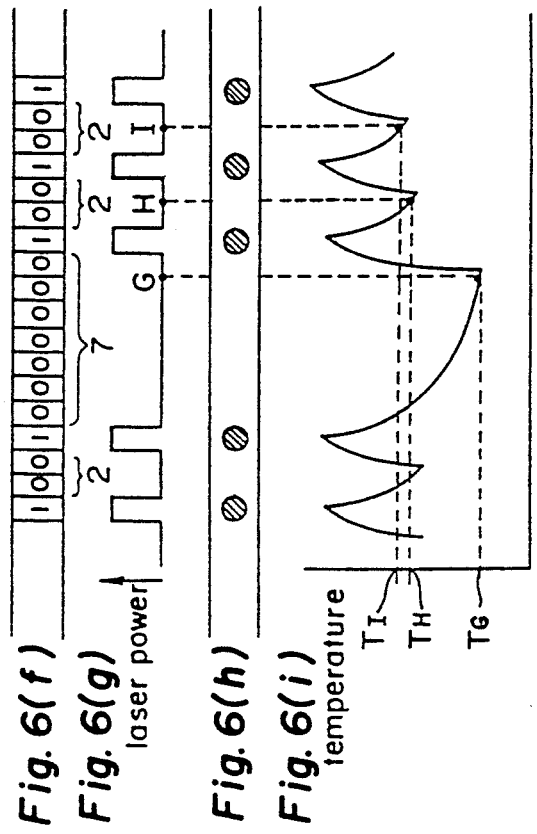

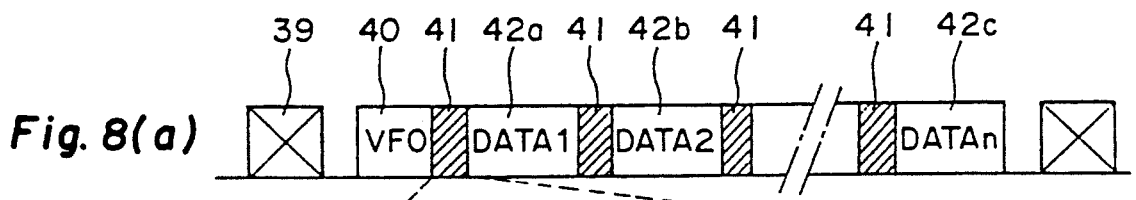
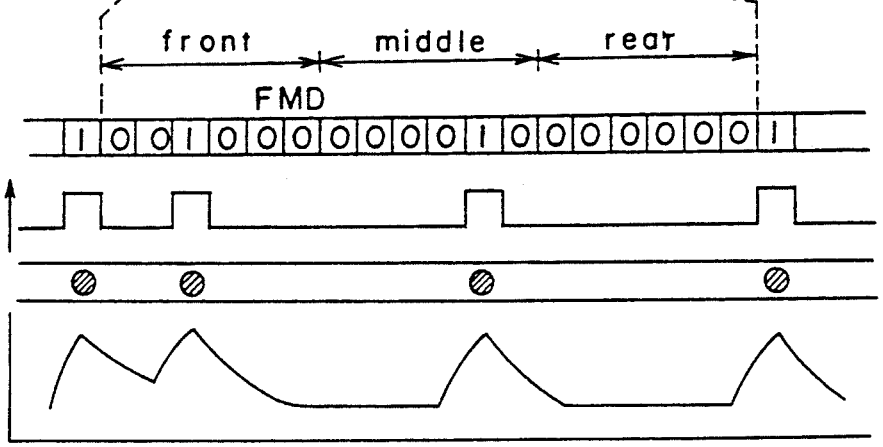
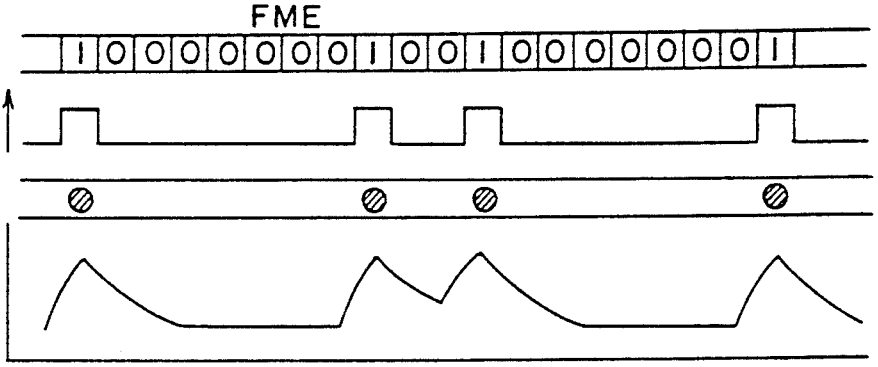
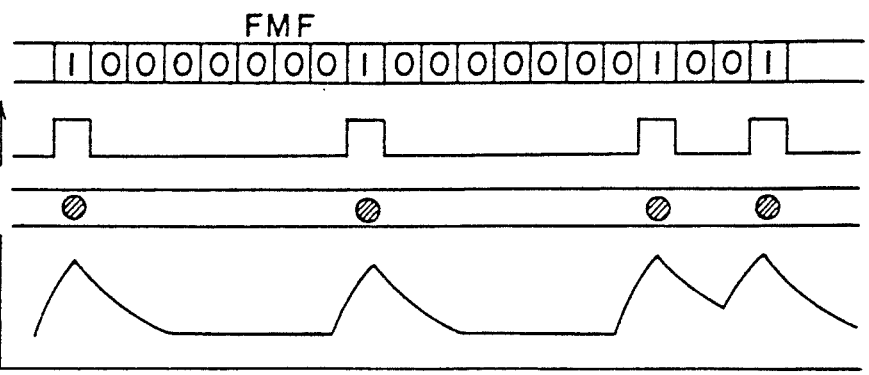

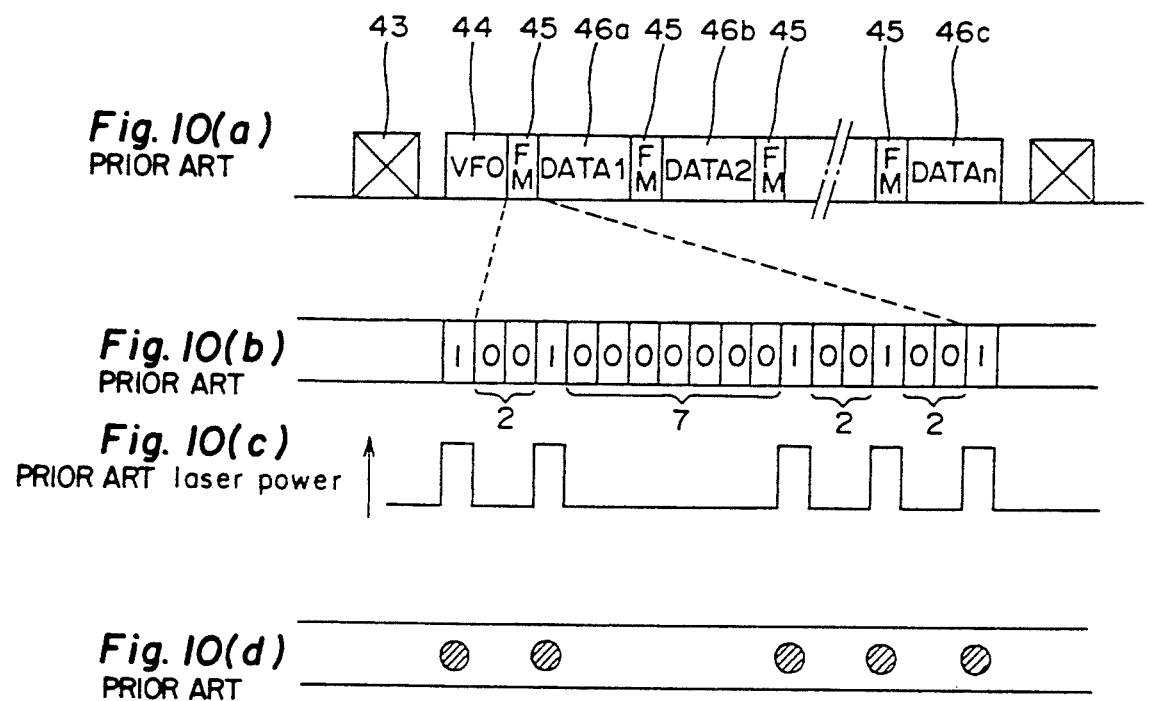

RECORDING METHOD AND RECORDING APPARATUS FOR OPTICAL DISK

This application is a continuation of now abandoned application Ser. No. 07/651,618, filed Feb. 6, 1991.

BACKGROUND OF THE INVENTION

The present invention generally relates to a recording method for an optical disk and a recording and reproducing apparatus, and more particularly, to a recording method and a recording and reproducing apparatus, which are capable of a rewriting operation, applying upon an optical disk laser beams of approximately 1 micron in diameter, recording and reproducing signals of high density, and erasing once recorded signals by laser application, so that signals can be recorded and reproduced many times.

FIG. 9 (a) shows a block diagram of a recording system of the conventional optical disk recording and reproducing apparatus. A modulating circuit 101 is adapted to modulate an input data 108 in accordance with a modulation rule so as to output modulation data 109 in accordance with a request from a selector 104.

A fixed pattern producing circuit 102 produces a fixed pattern FM 110 in accordance with a request from the selector 104.

A synchronous signal producing circuit 103 produces a synchronous signal VFO 111 in accordance with a request from the selector 104.

The selector 104 combines the modulation data 109, the fixed pattern FM 110, and the synchronous signal VFO 111 so as to output recording data 112.

A laser driving circuit 105 drives the semiconductor laser 106 in accordance with the recording data 112 to apply the recording data 112 upon the optical disk 107, so that, for example, the reflection ratio variation and so on are produced so as to effect the recording operation.

FIG. 9 (b) shows a block diagram of a reproduction system of the conventional optical disk recording and reproducing apparatus.

A weak laser power is applied to the optical disk 107 so as to obtain a reproduction signal RF 118 through detecting the reflection light by an optical detector 113.

A binary coded circuit 114 codes the reproducing signal RF 118 into a binary coded signal DSG 119.

A PLL circuit 115 generates a reproduction reference clock CLK 120 from the binary coded signal DSG 119.

A fixed pattern detecting circuit 116 detects a fixed pattern FM 110 from the binary coded signal DSG 119 and the reproduction reference clock CLK 120 so as to produce the detection signal FMD 121.

A demodulating circuit 117 demodulates the binary coded signal DSG 119 from the reproduction reference clock CLK 120 and the detection signal FMD 121 so as to output the demodulation data.

FIG. 10 (a) shows a data format recorded on the optical disk by the conventional optical disk recording and reproducing apparatus. The recording operation is effected in the order of a synchronous signal portion 44, a fixed pattern portion 45, a data 1 46a, a fixed pattern portion 45, a data 2 46b, . . . , a fixed pattern portion 45, and a data 46c, in succession subsequent to address portion 43 preformatted previously on the optical disk.

The synchronous signal VFO (FIG. 9, 111) is recorded on the synchronous signal portion 44 for use in the locking of the PLL circuit (FIG. 9, 115).

The fixed pattern FM (FIG. 9, 110) is normally recorded on the fixed pattern portion 45 so as to indicate the head of the data signal, and at the same time is used to synchronize the data signal.

FIG. 10 (b) shows a concrete pattern 2-7-2-2 for the conventional fixed pattern FM (FIG. 9, 110) on the expression of (2-7) run-length-limited code as shown with D15 (Draft International Standard) 10089. The conventional fixed pattern is constructed in the fixed pattern of 2-7-2-2 in terms of the run length of zeros where the minimum run length of zeros 2 and the maximum run length of zeros 7 are adjacent to each other (i.e. having a 1 located therebetween), and the minimum run length of zeros 2 is adjacent to the other minimum run length of zeros 2.

FIG. 10 (c) shows, for example, the modulation wave form of the laser when the conventional fixed pattern portion FM is actually recorded on a phase variation rewriting type optical disk. At the location of the data 0, the erasing power (comparatively low power) is applied to erase the previous data. At the location of the data 1, the recording power (comparatively high power) is applied so as to produce the recording pits. The state of the recording pits is shown in FIG. 10 (d).

SUMMARY OF THE INVENTION

Accordingly, the present invention has been developed with a view to substantially eliminating the above discussed drawbacks inherent in the prior art, and for its essential object to provide an improved data recording method and a recording and reproducing apparatus.

Another important object of the present invention is to provide the improved data recording method and recording and reproducing apparatus which restrains the repetition deterioration of the optical disk so as to improve the repetition frequency.

In accomplishing these and other objects, the present invention is a recording method for an optical disk which uses a data format having a fixed pattern with the minimum run length of zeros and the maximum run length of zeros not being adjacent to each other.

The temperature difference caused at the recording time on the optical disk may be made smaller, the thermal stress to be applied upon the medium is reduced, the deterioration is retrained, and the repetition frequency may be improved by the above described construction.

The present invention is a recording method for an optical disk which uses a data format having a fixed pattern where the minimum run length of zeros is adjacent to the maximum run length of zeros, and the minimum run length of zeros are not adjacent to each other.

By the above described construction, the temperature difference caused at the recording time on the optical disk may be made smaller, the thermal stress to be applied upon the medium may be reduced, the deterioration may be restrained, and the repetition frequency may be improved.

The present invention is a recording method for an optical disk characterized by the use of a data format having a fixed pattern portion constructed through the selection of one data pattern at random for each of the recordings from among a plurality of different data patterns.

By the above described construction, the probability of recording the same fixed pattern for each of the recordings may be made smaller, thermal stresses may be prevented from being normally applied upon a small location, and thermal stresses may be dispersed to prevent the deterioration so as to improve the repetition frequency.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1 (b) is a block diagram of a reproducing system of a recording and reproducing apparatus for an optical disk in the first embodiment of the present invention;

FIG. 2 (a) is a block diagram of a data format for an optical disk in the first embodiment of the present invention;

FIG. 2 (b) is a chart showing a fixed pattern in the first embodiment of the present invention;

FIG. 2 (c) is a chart showing the laser modulation waveform at the fixed pattern recording time in the first embodiment of the present invention;

FIG. 2 (d) is a chart showing the recording pits at the fixed pattern recording time in the first embodiment of the present invention;

FIG. 2 (e) is a chart showing the highest arrival temperature variation at the fixed pattern recording time in the first embodiment of the present invention;

FIG. 2 (f) is a block diagram showing the conventional fixed pattern;

FIG. 2 (g) is a chart showing a laser modulation waveform at the conventional fixed pattern recording time;

FIG. 2 (h) is a chart showing the recording pits at the conventional fixed pattern recording time; and FIG. 2 (i) is a chart showing the highest arrival temperature variation at the conventional fixed pattern recording time.

FIG. 3 (b) is a block diagram of a reproduction system of a recording and reproducing apparatus for the optical disk in the second embodiment of the present invention;

FIG. 4 (a) is a block diagram of a data format for an optical disk in the second embodiment of the present invention;

FIG. 4 (b) is a chart showing a fixed pattern in the second embodiment of the present invention;

FIG. 4 (c) is a chart showing the laser modulation waveform at the fixed pattern recording time of the second embodiment of the present invention;

FIG. 4 (d) shows the recording pits at the fixed pattern recording time in the second embodiment of the present invention;

FIG. 4 (e) is a chart showing the highest arrival temperature variation at the fixed pattern recording time in the second embodiment of the present invention;

FIG. 4 (f) is a block diagram showing the conventional fixed pattern;

FIG. 4 (g) is a chart showing a laser modulation waveform at the conventional fixed pattern recording time;

FIG. 4 (h) is a chart showing the recording pits at the conventional fixed pattern recording time; and FIG. 4 (i) is a chart showing the highest arrival temperature variation at the conventional fixed pattern recording time.

FIG. 5 (b) is a block diagram of a reproduction system of the recording and reproducing apparatus for the optical disk in the third embodiment of the present invention;

FIG. 6 (a) is a block diagram of a data format for an optical disk in a third embodiment of the present invention;

FIG. 6 (b) is a chart showing a first fixed pattern in the third embodiment of the present invention;

FIG. 6 (c) is a chart showing the laser modulation waveform at the first fixed pattern recording time in the third embodiment of the present invention;

FIG. 6 (d) is a chart showing the recording pits at a first fixed pattern recording time in the third embodiment of the present invention;

FIG. 6 (e) is a chart showing the highest arrival temperature variation at the first fixed pattern recording time in the third embodiment of the present invention;

FIG. 6 (f) is a block diagram showing the conventional fixed pattern;

FIG. 6 (g) is a chart showing a laser modulation waveform at the conventional fixed pattern recording time;

FIG. 6 (h) is a chart showing the recording pits at the conventional fixed pattern recording time; and FIG. 6 (i) is a chart showing the highest arrival temperature variation at the conventional fixed pattern recording time.

FIG. 7 (b) is a block diagram of a reproduction system of the recording and reproducing apparatus for the optical disk in the fourth embodiment of the present invention;

FIG. 8 (a) is a block diagram of a data format for an optical disk in a fourth embodiment of the present invention;

Figure 9A:
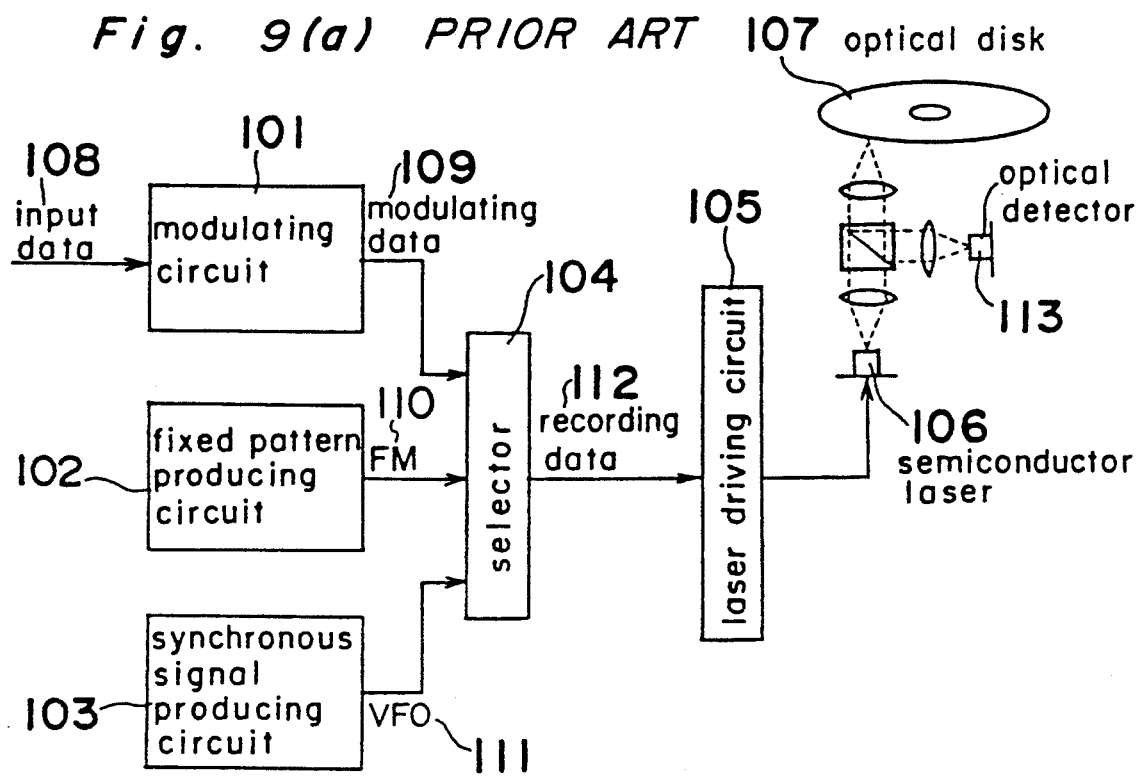
Figure 9B:
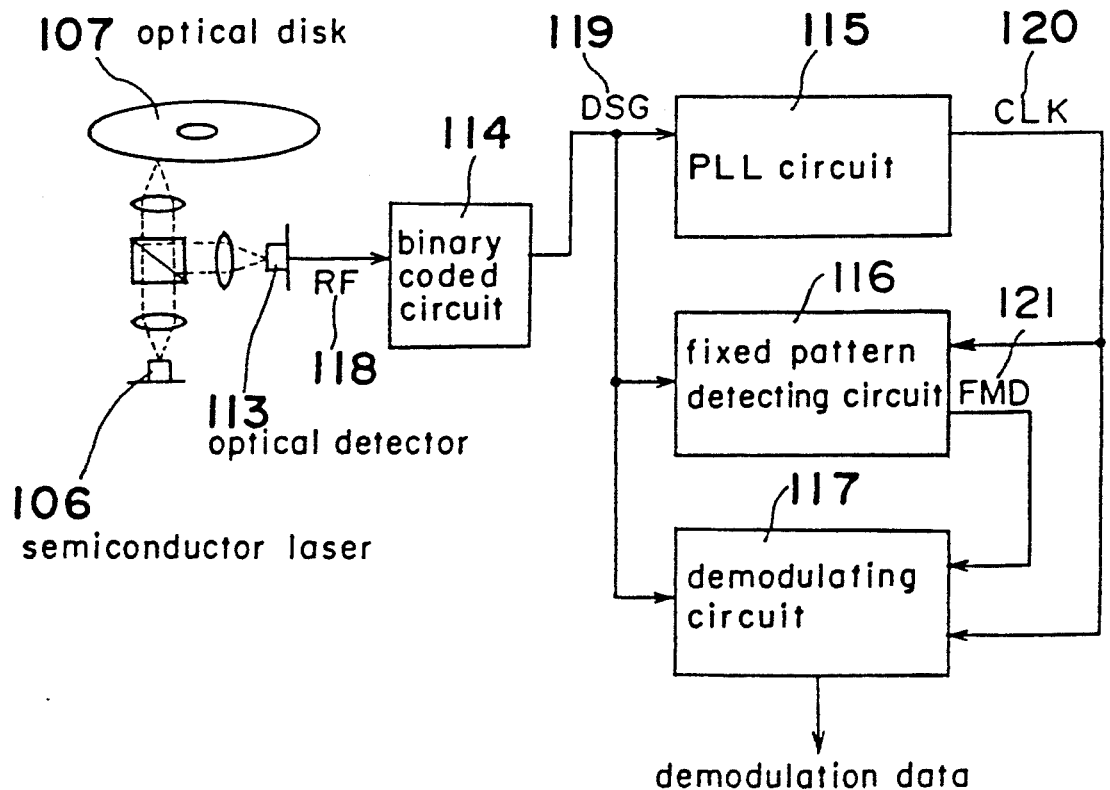

Big. 8 (b) is a chart showing a first fixed pattern in the fourth embodiment of the present invention;

FIG. 8 (c) is a chart showing the laser modulation waveform at the first fixed pattern recording time in the fourth embodiment of the present invention;

FIG. 8 (d) is a chart showing the recording pits at a first fixed pattern recording time in the fourth embodiment of the present invention;

FIG. 8 (e) is a chart showing the highest arrival temperature variation at the first fixed pattern recording time in the fourth embodiment of the present invention;

FIG. 8 (f) is a chart showing a second fixed pattern in the fourth embodiment of the present invention;

FIG. 8 (g) is a chart showing the laser modulation waveform at the second fixed pattern recording time in the fourth embodiment of the present invention;

FIG. 8 (h) is a chart showing the recording pits at the second fixed pattern recording time in the fourth embodiment of the present invention;

FIG. 8 (i) is a chart showing the highest arrival temperature variation at the second fixed pattern recording time in the fourth embodiment of the present invention;

FIG. 8 (j) is a chart showing a third fixed pattern in the fourth embodiment of the present invention;

FIG. 8 (k) is a chart showing a laser modulation waveform at the third fixed pattern recording time in the fourth embodiment of the present invention;

FIG. 8 (l) is a chart showing the recording pits at the third fixed pattern recording time in the fourth embodiment of the present invention;

FIG. 8 (m) is a chart showing the highest arrival temperature variation at the third fixed pattern recording time in the fourth embodiment of the present invention;

FIG. 9 (a) is a block diagram of a recording system of the conventional optical disk recording and reproducing apparatus;

FIG. 9 (b) is a block diagram of a reproducing system of the conventional optical disk recording and reproducing apparatus;

FIG. 10 (a) is a block diagram of a data format for the conventional optical disk;

FIG. 10 (b) is a block diagram showing the conventional fixed pattern;

FIG. 10 (c) is a chart showing a laser modulation waveform at the conventional fixed pattern recording time; and FIG. 10 (d) is a chart showing the recording pits at the conventional fixed pattern recording time.

DETAILED DESCRIPTION OF THE INVENTION

Before the description of the present invention proceeds, it is to be noted that like parts are designated by like reference numerals throughout the accompanying drawings.

The optical disk recording method and recording and reproducing apparatus in the embodiments of the present invention will be described hereinafter.

Figure 1:
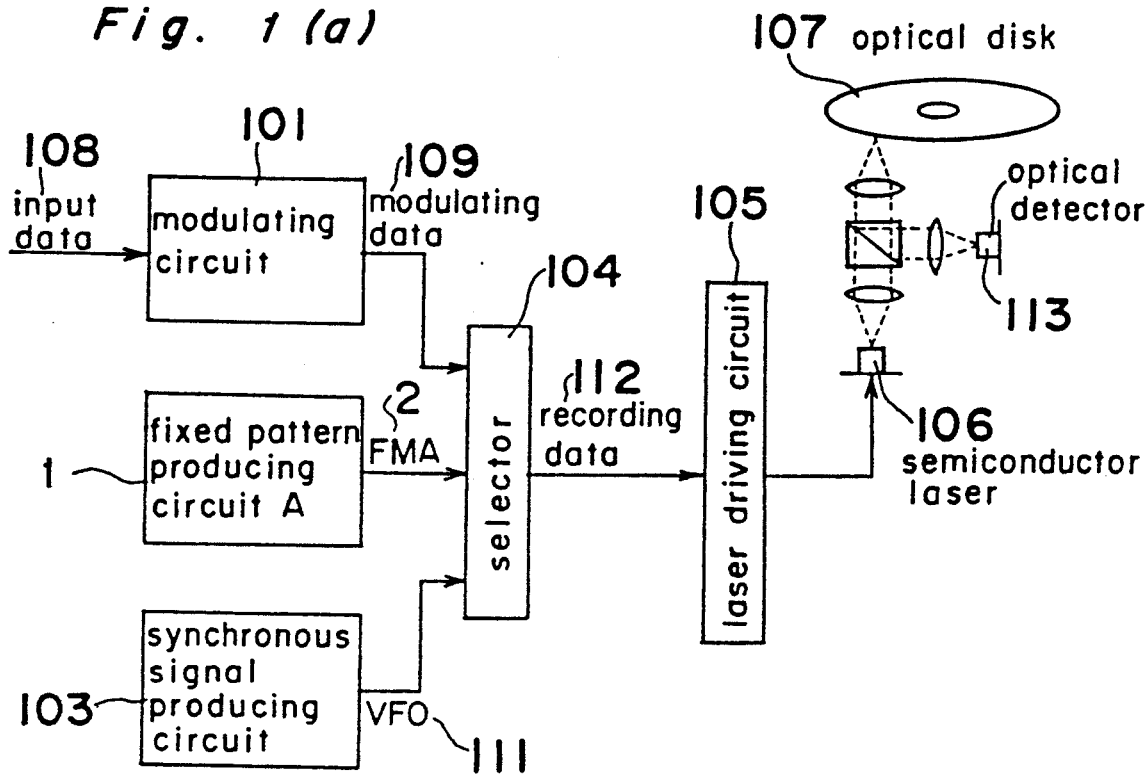
FIG. 1 (a) is a block diagram of a recording system of a recording and reproducing apparatus for an optical disk in a first embodiment of the present invention.
Figure 1:
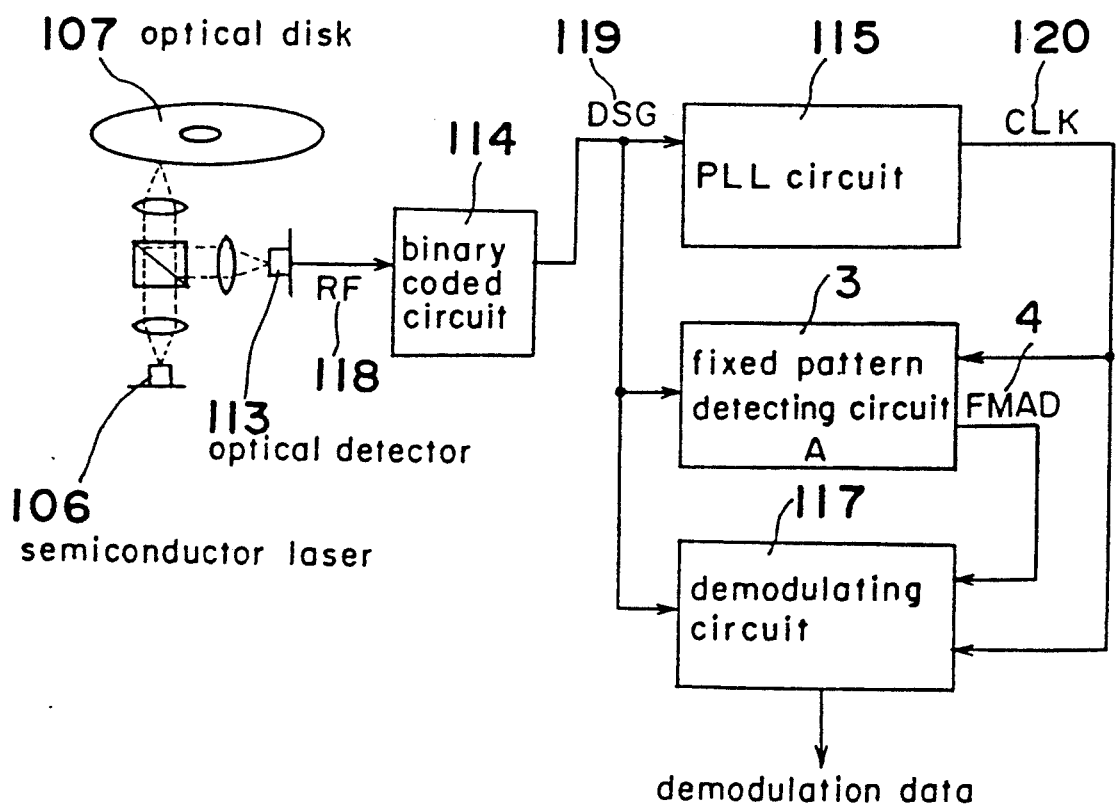

Referring now to the drawings, there is shown in FIG. 1, a block diagram of a recording and reproducing apparatus for an optical disc in a first embodiment of the present invention. FIG. 1 (a) shows a recording system, and FIG. 1 (b) shows a reproducing system. It is to be noted that like parts in the conventional embodiment of FIG. 9 are designated by like reference numerals. The points which are different from those in the conventional embodiment of FIG. 9 will be described hereinafter.

A fixed pattern FMA producing circuit 1 outputs a fixed pattern FMA 2.

A fixed pattern FMA detecting circuit 3 detects the fixed pattern FMA so as to output a detecting signal FMAD 4.

FIG. 2 (a) shows a data format to be recorded on an optical disc by a recording and reproducing apparatus for an optical disc in the first embodiment of FIG. 1. The recording operation is effected in the order of a synchronous signal portion 6, a fixed pattern portion 7, a data 1 8a, a fixed pattern portion 7, a data 2 8b, ... a fixed pattern portion 7, a data n 8c, followed by an address portion 5 address portion 5 preformatted on the optical disc.

The synchronous signal VFO (FIG. 1, 111) is recorded on the above described synchronous signal portion 6 and is used for the lock of a PLL circuit (FIG. 1, 115).

The fixed pattern FMA is normally recorded on the above described fixed pattern potion 7 to indicate the head of the data signal, and at the same time, is used for synchronization with the data signal.

FIG. 2 (b) shows the concrete pattern of the fixed pattern FMA. The pattern is the fixed pattern of 3-7-3-3 in the terms of the run length of zeros of (2,7) run-length-limited code with the maximum run length of zeros 7 being not adjacent to the minimum run length of zeros 2.

FIG. 2 (c) shows the modulation waveform of the laser when, for example, the fixed pattern FMA of the present embodiment is actually recorded on an optical disc of the phase change rewriting type. In the locations of the data 0, the erasing power (comparatively low power) is applied so as to erase the previous data. In the locations of the data 1, the recording power (comparatively high power) is applied so as to generate the recording bits. The recording bits are shown in FIG. 2 (d).

The conventional fixed pattern FM is shown in FIG. 2 (f) for comparison. FIG. 2 (g) shows the modulation wave form of the laser when the conventional fixed pattern FM is really recorded on the optical disc of the phase change rewriting type. In the locations where the data are 0, the erasing power (comparatively low power) is applied, and the previous data are erased. In the locations where the data are 1, the recording power (comparatively high power) is applied so as to generate the recording bits. The recording bits are shown in FIG. 2 (h).

FIG. 2 (i) shows the highest arrival temperature change in the optical disc medium when the conventional fixed pattern FM is recorded. The G point which is in the rear portion of a space 7 passes the comparatively long period of time from the application of the recording power. The H point which is in the rear portion of the space 2 passes only a comparatively short period of time from the application of the recording power, so that the highest arrival temperature $T_H$ of the H point becomes higher than the highest arrival temperature $T_G$ of the G point ($T_H > T_G$). As the I point which is the rear portion of the last space 2 of the conventional fixed pattern 2-7-2-2 passes only for a short period of time after two time application for the short period time in the minimum run length of zeros 2, the highest arrival temperature $T_I$ of the I point becomes much higher ($T_I > T_H > T_G$) than the highest arrival temperatures $T_G$, $T_H$ of the G point, the H point. As the same fixed pattern FM is recorded for each recording, the temperature difference $T_H - T_G$ between the G point and the H point, and the temperature difference $T_I - T_G$ between the G point and the I point are normally caused.

The highest arrival temperature change in the optical disc medium when the fixed pattern FMA of the present embodiment is shown in FIG. 2 (e). The fixed pattern FMA in the present embodiment is the fixed pattern of 3-7-3-3 in terms of the run length of zeros. The A point which is in the rear portion of a space 7 passes the comparatively long period of time after the application of the recording power. The B point which is in the rear portion of the space 3 passes only a comparatively short period of time than the A point from the application of the recording power, so that the highest arrival temperature $T_B$ of the B point becomes higher than the highest arrival temperature $T_A$ of the A point ($T_B > T_A$). The time elapsed from the application of the recording power in the B point which is in the rear portion of the space 3 is longer than the elapsed time from the application of the recording power, in the H pint in the rear portion of the space 2, within the conventional fixed pattern portion, so that the highest arrival temperature $T_B$ of the B point becomes lower than the highest arrival temperature $T_H$ of the H point ($T_H > T_B$). As a matter of fact it is lower than the highest arrival temperature $T_I$ of the conventional I point ($T_I > T_H > T_B$). Although in the present embodiment, the temperature difference $T_B - T_A$ is caused at the fixed pattern FMA recording time in the present embodiment, the above described temperature difference $T_B - T_A$ becomes smaller than the temperature difference $T_H - T_G$, $T_I - T_G$ to be caused at the conventional fixed pattern FM recording time.

According to the present embodiment, the fixed pattern is adapted so that the minimum run length of zeros and the maximum run length of zeros are not adjacent each other, so that the temperature difference to be caused at the fixed pattern recording time may be made smaller than before. The thermal stress to be applied upon the medium is reduced, the deterioration of the medium is restrained, and the repetitive frequency may be improved.

Although the case of (2,7) run-length-limited code has been described in the present embodiment, the same effect may be obtained even in the case of the other modulation code system (for example, (4, 15) run-length-limited code, and so on).

Although the description is given in a case where the fixed pattern shows the head of the data signal, and is used for synchronization of the data signal in the present embodiment, the same effect may be obtained even in a case where it is used for an other object.

Figure 3A:
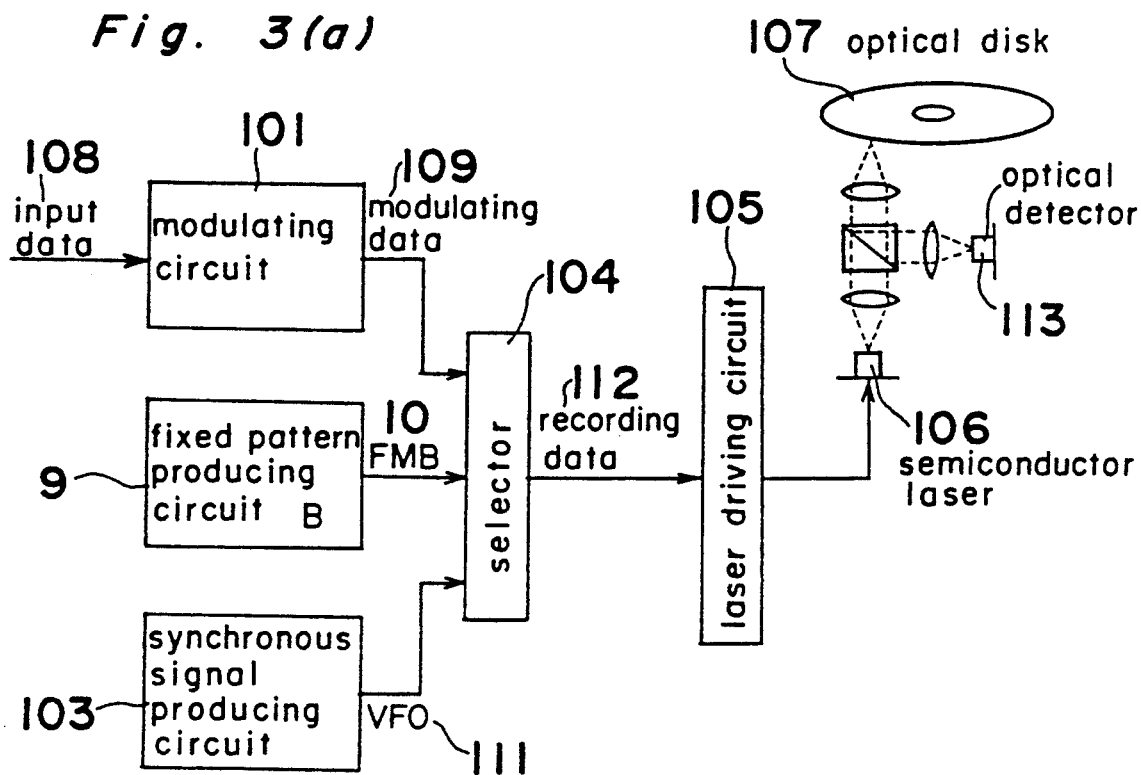
FIG. 3 (a) is a block diagram of a recording system of the recording and reproducing apparatus for an optical disk in a second embodiment of the present invention.
Figure 3B:
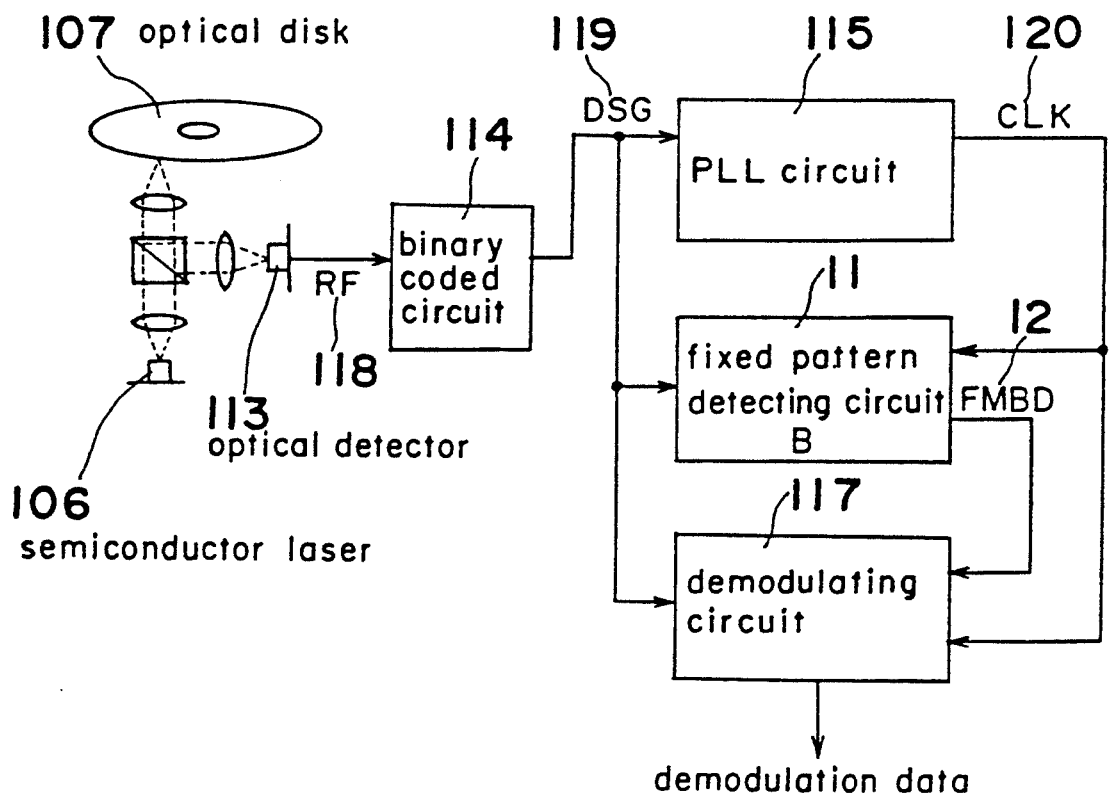

FIG. 3 shows the block diagram of the recording and reproducing apparatus of the optical disc in a second embodiment of the present invention. FIG. 3 (a) shows the recording system, and FIG. 3 (b) shows the reproducing system. The same reference numerals are given to the same parts as in the conventional embodiment of FIG. 9. The points different from those in the conventional embodiment of FIG. 9 will be described hereinafter.

The fixed pattern FMB producing circuit 9 outputs the fixed pattern FMB 10.

The fixed pattern FMB detecting circuit 11 detects a fixed pattern FMB so as to output a detecting signal FMBD 12.

FIG. 4 (a) shows a data format to be recorded on the optical disc by the recording and reproducing apparatus for the optical disc in the second embodiment of FIG. 3. The recording operation is effected in the order of a synchronous signal portion 14, a fixed pattern portion 15, a data 1 16a, a fixed pattern portion 15, a data 2 16b, ... a fixed pattern portion 15, a data n 16c, followed by an address portion 13 preformatted on the optical disc.

The synchronous signal VFO (FIG. 3, 111) is recorded on the above described synchronous signal portion 14 and is used for the lock of a PLL circuit (FIG. 3, 115).

The fixed pattern FMB (FIG. 3, 10) is normally recorded on the above described fixed pattern potion 15 to indicate the head of the data signal, and at the same time, is used for synchronization with the data signal.

FIG. 4 (b) shows the concrete pattern of the fixed pattern FMB. The pattern is the fixed pattern of 7-4-7 in terms of the run length of zeros of (2,7) run-length-limited code with the maximum run length of zeros 7 being not adjacent to the minimum run length of zeros 2. Also, the pattern of 7-4-7 is a violation code of the (2,7) run-length-limited code.

FIG. 4 (c) shows the modulation waveform of the laser when, for example, the fixed pattern FMB of the present embodiment is actually recorded on the optical disc of the phase change rewriting type. In the locations where the data are 0, the erasing power (comparatively low power) is applied so as to erase the previous data. In the locations where the data are 1, the recording power (comparatively low power) is applied so as to generate the recording bits. The recording bits are shown in FIG. 4 (d).

The conventional fixed pattern FM is shown in FIG. 4 (f) for comparison. FIG. 4 (g) shows the modulation wave form of the laser when the conventional fixed pattern FM is recorded on the optical disc of the phase change rewriting type. In the locations where the data are 0, the erasing power (comparatively low power) is applied, and the previous data are erased. In the locations where the data are 1, the recording power (comparatively high power) is applied so as to generate the recording bits. The recording bits are shown in FIG. 4 (h).

FIG. 4 (i) shows the highest arrival temperature change in the optical disc medium when the conventional fixed pattern FM is recorded. The G point which is in the rear portion of a space 7 passes the comparatively long period of time from the application of the recording power. The H point which is in the rear portion of the space 2 passes only a comparatively short period of time after the application of the recording power, so that the highest arrival temperature $T_H$ of the H point becomes higher than the highest arrival temperature $T_G$ of the G point ($T_H > T_G$). The I point which is in the rear portion of the last space 2 of the conventional fixed pattern 2-7-2-2 passes only a short period of time after two time application of the recording power for a short time period in the minimum run length of zeros 2, so that the highest arrival temperature $T_I$ of I point becomes much higher than the highest arrival temperatures $T_G$, $T_H$ of the G point, the H point ($T_I > T_H > T_G$). As the same fixed pattern FM is recorded for each recording, the temperature difference $T_H - T_G$ between the G point and the H point, the temperature difference $T_I - T_G$ between the G point and the I point are normally caused.

The highest arrival temperature change in the optical disc medium when the fixed pattern FMB of the present embodiment is shown in FIG. 4 (e). The fixed pattern FMB in the present embodiment is the fixed pattern of 7-4-7 in terms of the run length of zeros. The C point which is in the rear portion of a space 7 passes a comparatively long period of time from the application of the recording power. As the D point which is in the rear portion of the space 4 passes only comparatively shorter period of time than the C point from the application of the recording power, the highest arrival temperature $T_D$ of the D point becomes higher ($T_D > T_C$). As the time elapsed from the application of the recording power in the D point which is in the rear portion of the space 4 is longer than the elapsed time from the application of the recording power, in the H point in the rear portion of the space 2, within the conventional fixed pattern FM, the highest arrival temperature $T_D$ of the D point becomes lower than the highest arrival temperature $T_H$ of the H point ($T_H > T_D$). As a matter of fact, it is lower than the highest arrival temperature $T_I$ of the conventional I point ($T_I > T_H > T_D >$). Although the temperature difference $T_D - T_C$ is caused at the fixed pattern FMB recording time in the present embodiment, the above described temperature difference $T_D-T_C$ becomes smaller than the temperature differences $T_H-T_G$, $T_I-T_G$ to be caused at the conventional fixed pattern FM recording time.

According to the present embodiment, the fixed pattern is the minimum run length of zeros and the maximum run length of zeros are not adjacent to each other, so that the temperature difference to be caused at the recording time within the fixed pattern portion may be made smaller than before. The thermal stress to be applied upon the medium is reduced, the deterioration of the medium is restrained, and the repetitive frequency may be improved.

Although the case of (2,7) run-length-limited code has been described in the present embodiment, the same effect may be obtained even in the case of other modulation systems (for example, (4, 15) run-length-limited code, and so on).

Although the description is given in a case where the fixed pattern shows the head of the data signal, is used for synchronization of the data signal in the present embodiment, the same effect may be obtained even in a case where it is used for other object.

Figure 5A:
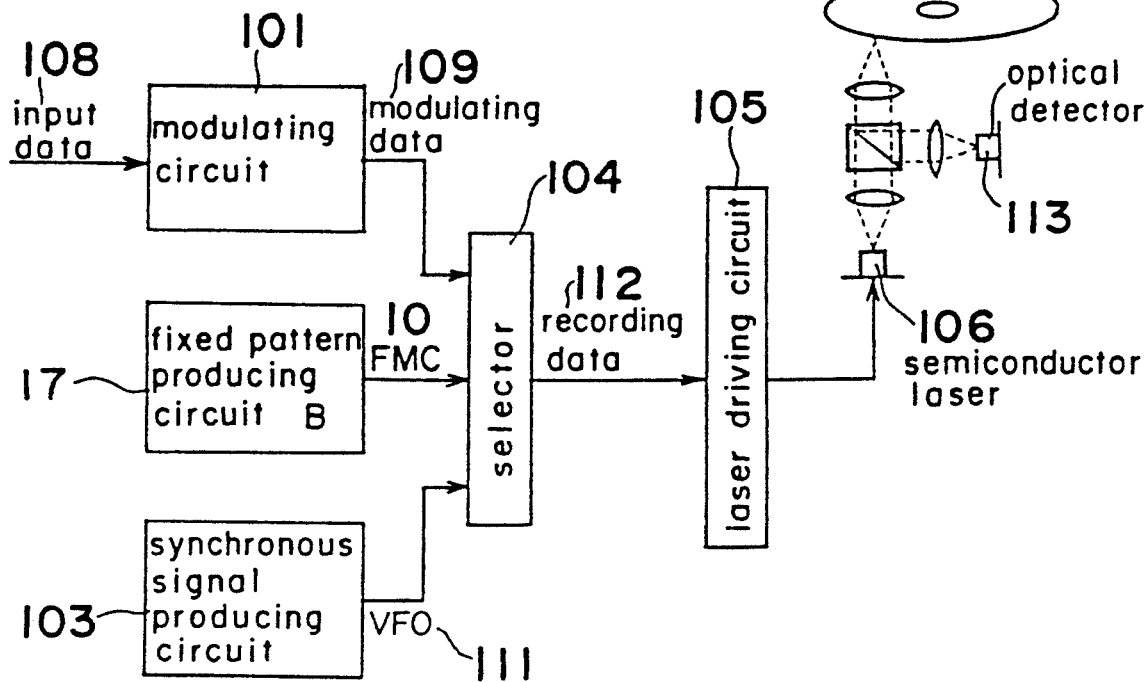
FIG. 5 (a) is a block diagram of a recording system of a recording and reproducing apparatus for an optical disk in a third embodiment of the present invention.
Figure 5B:
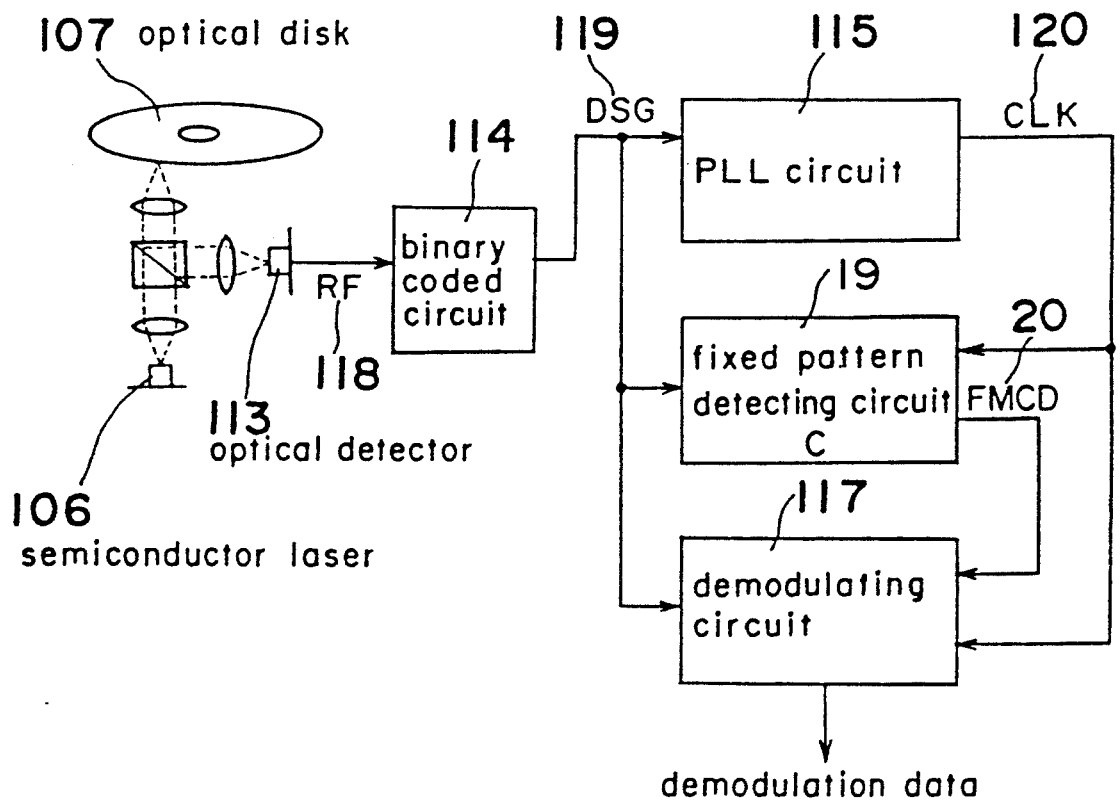

FIG. 5 shows the block diagram of the recording and reproducing apparatus for the optical disc in a third embodiment of the present invention. FIG. 5 (a) shows the recording system, and FIG. 5 (b) shows the reproducing system. The points which are different from those in the conventional embodiment of FIG. 9 will be described hereinafter.

The fixed pattern FMC producing circuit 17 outputs the fixed pattern FMC 18.

The fixed pattern FMC detecting circuit 19 detects a fixed pattern FMC so as to output a detecting signal FMCD 20.

FIG. 6 (a) shows a data format to be recorded on the optical disc by the recording and reproducing apparatus of the optical disc in the third embodiment of FIG. 5. The recording operation is effected in the order of a synchronous signal portion 22, a fixed pattern portion 23, a data 1 24a, a fixed pattern portion 23, a data 2 24b, ... a fixed pattern portion 23, a data n 24c, followed by an address portion 21 preformatted on the optical disc.

The synchronous signal VFO (FIG. 5, 111) is recorded on the above described synchronous signal portion 22 and is used for the lock of a PLL circuit (FIG. 5, 115).

The fixed pattern FMC is normally recorded on the above described fixed pattern portion 23 to indicate the head of the data signal, and at the same time, is used for synchronization with the data signal.

FIG. 6 (b) shows the concrete pattern of the fixed pattern FMC. The pattern is the fixed pattern of 2-7-2-7 in the terms of the run length of zeros of (2,7) run-length-limited code with the maximum run length of zeros 7 being adjacent to the minimum run length of zeros 2, but the minimum run length of zeros 2 is not adjacent to another minimum run length of zeros 2. Also, the pattern 7-2 to be included in the 2-7-2-7 pattern is a violation code of the (2,7) run-length-limited code. FIG. 6 (c) shows the modulation waveform of the laser when, for example, the fixed pattern FMC of the present embodiment is actually recorded on the optical disc of the phase change rewriting type. In the locations where the data are 0, the erasing power (comparatively low power) is applied so as to erase the previous data. In the locations where the data are 1, the recording power (comparatively high power) is applied so as to generate the recording bits. The recording bits are shown in FIG. 6 (d).

The conventional fixed pattern FM is shown in FIG. 6 (f) for comparison. FIG. 6 (g) shows the modulation waveform of the laser when the conventional fixed pattern FM is actually recorded on the optical disc of the phase change rewriting type. In the locations where the data are 0, the erasing power (comparatively low power) is applied, and the previous data is erased. In the locations where the data are 1, the recording power (comparatively high power) is applied so as to generate the recording bits. The recording bits are shown in FIG. 6 (h).

FIG. 6 (i) shows the highest arrival temperature change in the optical disc medium when the conventional fixed pattern FM is recorded. The G point which is in the rear portion of the space 7 passes a comparatively long period of time from the application of the recording power. The H point which is in the rear portion of the space 2 passes only a comparatively short period of time from the application of the recording power, so that the highest arrival temperature $T_H$ of the H point becomes higher than the highest arrival temperature $T_G$ of the G point ($T_H > T_G$). As the I point which is in the rear portion of the last space 2 of the conventional fixed pattern 2-7-2-2 passes only a short period of time after two time application of the recording power for the short time time in the minimum run length of zeros 2, the highest arrival temperature $T_I$ of the I point becomes much higher than the highest arrival temperatures $T_G$, $T_H$ of the G point, the H point ($T_I > T_H > T_G$). As the same fixed pattern FM is recorded for each recording, the temperature difference $T_H-T_G$ between the G point and the H point, the temperature difference $T_I-T_G$ between the G point and the I point are normally caused.

The highest arrival temperature change in the optical disc medium when the fixed pattern FMC of the present embodiment is shown in FIG. 6 (e). The fixed pattern FMC in the present embodiment is the fixed pattern of 2-7-2-7 in terms of the run length of zeros. The E point which is in the rear portion of the space 7 passes a comparatively long period of time from the application of the recording power. As the F point which is in the rear portion of the space 2 passes only a comparatively shorter period time than the E point from the application of the recording power, the highest arrival temperature $T_F$ of the F point becomes higher than the highest arrival temperature $T_E$ of the E point ($T_F > T_F$). But as the I point within the conventional fixed pattern FM passes only a short period of time and after two time application of the recording power for a short period of time in the minimum run length of zeros 2, the highest arrival temperature $T_I$ becomes much higher than the highest arrival temperature $T_F$ of the F point in the present embodiment ($T_I > T_F$). In the present embodiment, the temperature difference $T_F-T_E$ exists at the fixed pattern FMC recording time. The above described temperature difference $T_F-T_E$ becomes smaller than the temperature difference $T_I-T_G$ to be caused at the conventional fixed pattern FM recording time.

According to the present embodiment, the fixed pattern is adapted the minimum run length of zeros are adjacent each other and the maximum run length of zeros, but not a minimum run length of zeros and another minimum run length of zeros are not adjacent each other so that the temperature difference to be caused at the recording time within the fixed pattern portion may be made smaller than before. The thermal stress to be applied upon the medium is reduced, the deterioration of the medium is restrained, and the repetitive frequency may be improved.

Although the case of (2,7) run-length-limited code has been described in the present embodiment, the same effect may be obtained even in the case of the other modulation system (for example, (4, 15) run-length-limited code, and so on).

Although the description is given in a case where the fixed pattern indicate the head of the data signal, and is used for synchronization of the data signal in the present embodiment, the same effect may be obtained even in a case where it is used for other objects.

Figure 7A:
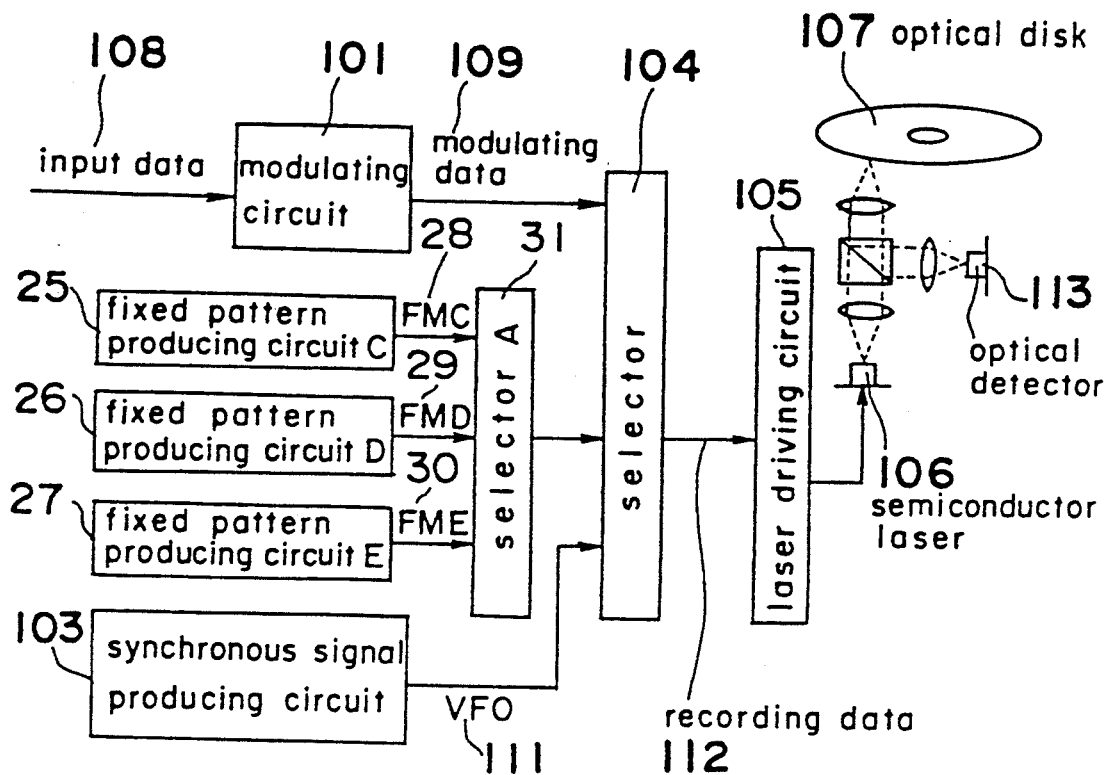
FIG. 7 (a) is a block diagram of a recording system of a recording and reproducing apparatus for an optical disk in a fourth embodiment of the present invention.
Figure 7B:
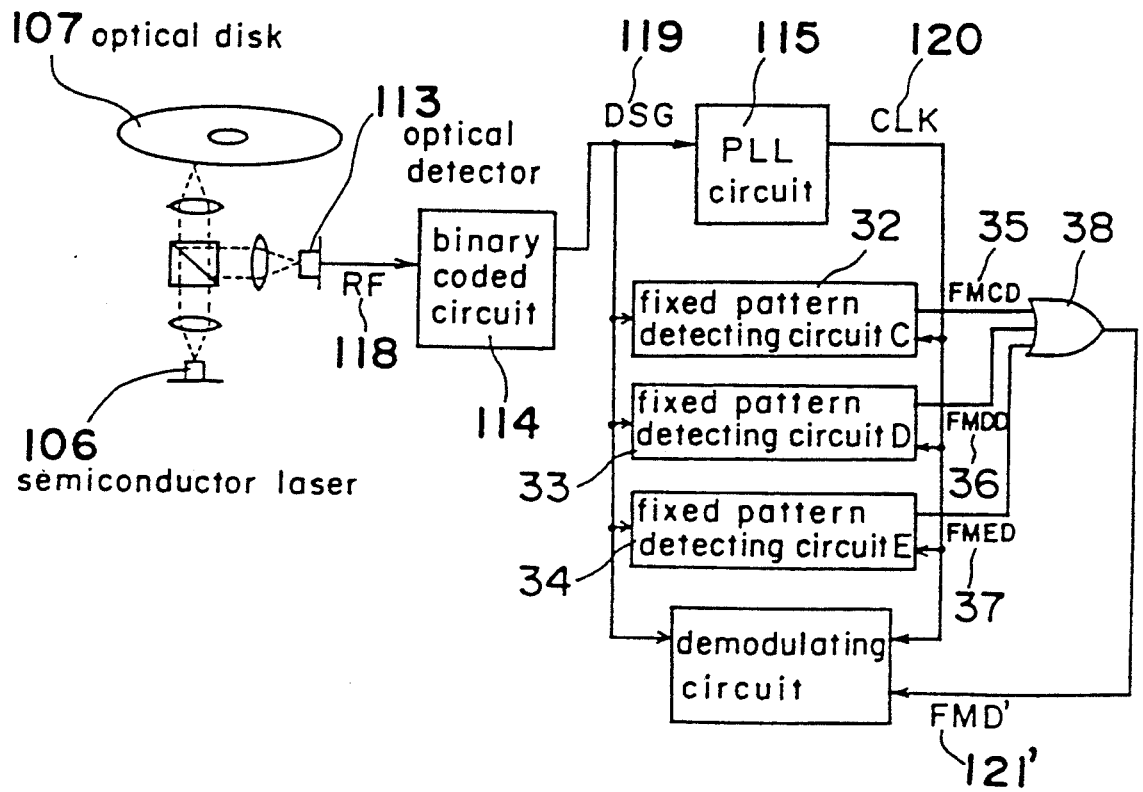

FIG. 7 shows a block diagram of the recording and reproducing apparatus of the optical disc in a fourth embodiment of the present invention. FIG. 7 (a) shows the recording system, and FIG. 7 (b) shows the reproducing system. The points which are different from those in the conventional embodiment of FIG. 9 will be described hereinafter.

The fixed pattern FMD producing circuit 25 outputs the fixed pattern FMD 28.

The fixed pattern FME producing circuit 26 outputs a fixed pattern FME 29.

The fixed pattern FMF producing circuit 27 outputs a fixed pattern FMF (30).

It is to be noted that the fixed patterns FMD, FME, FMF are respectively different patterns. Concretely, the FMD are the patterns of 2-7-7 in terms of the run length of zeros of the (2,7) run-length-limited code, the FME is a pattern of the 7-2-7, and the FMF is a pattern of the 7-7-2.

The selector 31 selects and, outputs one at random from the fixed pattern FMD 28, the FME 29, and the FMF 30 when a request of the selector 104 has been effected.

A fixed pattern FMD detecting circuit 32 detects the fixed pattern FMD so as to output the detecting signal FMDD 35.

A fixed pattern FME detecting circuit 33 detects the fixed pattern FME so as to output a detecting signal FMED 36.

A fixed pattern FMF detecting circuit 34 detects a fixed pattern FMF so as to output a detecting signal FMFD 37.

An OR circuit 38 generates the OR of the detecting signals FMDD, FMED, FMFD as a detecting signal FMD' 121'. Therefore, if either of the fixed patterns FMD, FME, FMF is detected, a detecting signal FMD' 121' is outputted.

FIG. 8 (a) shows a data format to be recorded on the optical disc by the recording and reproducing apparatus for the optical disc in a fourth embodiment of FIG. 7. The recording operation is effected in the order of a synchronous signal portion 40, a fixed pattern portion 41, a data 1 42a, a fixed pattern portion 41, a data 2 42b, ... a fixed pattern portion 41, a data n 42c, followed by an address portion 39 preformatted on the optical disc.

The synchronous signal VFO (FIG. 7, 111) is recorded on the above described synchronous signal portion 40 and is used for the lock of a PLL circuit (FIG. 7, 115).

A fixed pattern selected at random from the fixed patterns FMD, FME, FMF is recorded on the fixed pattern portion 41, indicates the head of the data signal and at the same time, and is used for synchronization of the data signal.

The fixed pattern portion when repetitive recording has been effected will be described hereinafter.

The concrete pattern of the fixed pattern portion at a first recording time will be shown in FIG. 8 (b). At this time, the pattern of FMD is selected, the fixed pattern of the 2-7-7 is recorded in the term of the run length of zeros of the (2,7) run-length-limited code.

The modulation waveform when a first fixed pattern FMD is recorded actually on the phase change rewriting type optical disc. In the locations where the data are 0, the erasing power (comparatively low power) is applied so as to erase the previous data. In the locations where the data are 1, the erasing power (comparatively high power) is applied so as to produce the recording bits. The recording bits are shown in FIG. 8 (d).

The highest arrival temperature distribution of the medium at the fixed pattern FMD recording time is shown in FIG. 8 (e). The front portion of the fixed pattern portion becomes higher at its average temperature as the recording power is applied in the minimum run length of zeros 2. The middle portion and the rear portion thereof become lower at its average temperature than the front portion as the recording power is applied in the space 7.

The concrete pattern of the fixed pattern portion at the second recording time will be shown in FIG. 8 (f). At this time, the pattern of the FME is selected, and the fixed pattern of the 7-2-7 is recorded in terms of the run length of zeros of the (2,7) run-length-limited code.

The modulation waveform of the laser when the second fixed pattern FME is actually recording on the phase change rewriting type optical disc is shown in FIG. 8 (g). In the locations of the data 0, the erasing power (comparatively low power) is applied so as to erase the previous data. In the locations of the data 1, the recording power (comparatively high power) is applied, and the recording bits are caused. The recording bits are shown in FIG. 8 (h).

FIG. 8 (i) shows the highest arrival temperature distribution of the medium at the second fixed pattern FME recording time. At this time, the average temperature of the middle portion of the fixed pattern portion becomes higher as the recording power is applied at the minimum run length of zeros 2, and the front portion and the rear portion become lower at the average temperature than the middle portion.

FIG. 8 (j) shows the concrete pattern of the fixed pattern portion at a third recording time. At this time, the pattern of the FMF is selected, and the fixed pattern of the 7-7-2 is recorded in terms of the run length of zeros of the (2,7) run-length-limited code.

The modulation waveform of the laser when the third fixed pattern FMF is actually recorded on the phase change rewriting type optical disc is shown in FIG. 8 (k). In the locations of data 0, the erasing power (comparatively low power) is applied so as to erase the previous data. In the locations of the data 1, the recording power (comparatively high power) is applied so as to produce the recording bits. The recording bits are shown in FIG. 8 (l).

The highest arrival temperature distribution of the medium at the third fixed pattern FMF recording time is shown in FIG. 8 (m). At this time, the average temperature of the rear portion of the fixed pattern portion becomes higher as the recording power is applied in the minimum run length of zeros 2, and the average temperature between the front portion and the middle portion becomes lower than the rear portion.

According to the present embodiment, the probability becomes higher in that the location where the temperature becomes higher changes for each recording operation into the front portion for the first time, the middle portion for the second time, the rear portion for the third time.

In accordance with the present embodiment, by the selection and recording of one fixed pattern at random from the different fixed patterns for each of the recordings, the probability that the same location within the fixed pattern portion becomes normally higher in temperature becomes lower. As the thermal stress can be dispersed, the fatigue of the medium is reduced, thus making it possible to improve the repetitive frequency of the record reproduction.

Although the example of selecting from three types of fixed patterns has been described in the present embodiment, the probability that the fixed pattern of the same pattern is recorded at each time becomes smaller than before if the selection is effected from the fixed patterns of two types or more becomes smaller than before, so that a similar effect is obtained.

Although the case of the (2,7) run-length-limited code has been described in the present embodiment, the similar effect may be obtained even in a case of the other modulation system (for example, the (4, 15) run-length-limited code and so on).

In the present embodiment, a case where the fixed pattern indicates the head of the data signal, and is used for the synchronization of the data signal is described, with a similar effect even in a case where it is used for other objects.

As the temperature difference to be normally caused at the recording time on the optical disk may be made as small as possible with the use of a data format having a fixed pattern portion which is composed of a data pattern where the minimum run length of zeros is not adjacent to the maximum run length of zeros, the thermal stress to be applied upon the medium is reduced, the deterioration is restrained, and the repetitive frequency is improved.

As the present invention uses the data format having the fixed pattern portion composed of a data pattern where the minimum run length of zeros is adjacent to the maximum run length of zeros, but a minimum run length of zeros is not adjacent to another minimum run length of zeros, the temperature difference to be normally caused at the recording time may be made as small as possible, so that the thermal stress to be applied upon the medium is reduced, the deterioration is restrained, and the repetitive frequency is improved.

The present invention uses a data format having a fixed pattern portion composed by the selection of one data pattern at random for each recording from a plurality of different data patterns, so that the probability of recording the same fixed patterns for each recording becomes smaller. As the thermal stress may be prevented from being applied upon the same location, the thermal stress is dispersed to restrain the deterioration and to improve the repetitive frequency.

Also, by the use of the data format having the fixed pattern portion composed of the data pattern where the minimum run length of zeros and the maximum run length of zeros are adjacent to each other and the minimum run length of zeros are not adjacent to each other, the temperature difference to be normally caused at the writing time may be made smaller as much as possible, so that thermal stress to be applied upon the medium is reduced, the deterioration thereof is restrained, the repetitive frequency is improved.

Also, by the use of the data format having the fixed pattern portion composed through selection of one data pattern for each recording at random from a plurality of different data patterns, the probability of recording the same fixed pattern is made smaller for each recording, the thermal stress may be prevented much as possible from being applied upon the same location, so that the thermal stress is dispersed, the deterioration is restrained, the repetitive frequency is improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of generating optical disk recording data formed of successive one bits and zero bits having a run length limited code data format in which at least a predetermined minimum run length of recorded zero bits or at most a predetermined maximum run length of zero bits is located on each side of recorded one bits, said method comprising;

generating a fixed pattern data frame used as a synchronous signal, the fixed pattern data frame having plural successive adjacent run lengths of zero bits with respective one bits located between each successive adjacent run lengths of zero bits and having at least two different run lengths of zero bits including at least one of the minimum run length of zero bits and the maximum run length of zero bits, wherein each run length of zero bits in the fixed pattern data frame which is located adjacent a minimum run length of zero bits has a run length which is less than the maximum run length of zero bits, and wherein each run length of zero bits in the fixed pattern data frame which is located adjacent a maximum run length of zero bits has a run length which is more than the minimum run length of zero bits; and, combining the fixed pattern data frame with input data in accordance with the run length limited code data format to generate the optical disk recording data;

wherein, in the optical disk recording data, an initial run length of zero bits of said fixed pattern data frame is immediately preceded by a one bit and a last run length of zero bits of said fixed pattern data frame is immediately followed by a one bit.

2. A method as recited in claim 1, wherein the fixed pattern data frame generated in said generating step includes in succession, a first run length of zero bits which contains the maximum run length of zero bits, and, a second run length of zero bits located adjacent the first run length of zero bits with a one bit located therebetween, the second run length of zero bits containing more than the minimum run length of zero bits and less than the maximum run length of zero bits.

3. A method as recited in claim 1, wherein the fixed pattern data frame generated in said generating step includes in succession,
- a first run length of zero bits which contains more than the minimum run length of zero bits and less than the maximum run length of zero bits,
- a second run length of zero bits located adjacent the first run length of zero bits with a one bit located therebetween, the second run length of zero bits containing the maximum run length of zero bits, and,
- a third run length of zero bits located adjacent the second run length of zero bits with a one bit located therebetween, the third run length of zero bits containing more than the minimum run length of zero bits and less than the maximum run length of zero bits.

4. A method as recited in claim 1, wherein the fixed pattern data frame generated in said generating step includes in succession,
- a first run length of zero bits which contains the maximum run length of zero bits,
- a second run length of zero bits located adjacent the first run length of zero bits with a one bit located therebetween, the second run length of zero bits containing more than the minimum run length of zero bits and less than the maximum run length of zero bits, and,
- a third run length of zero bits located adjacent the second run length of zero bits with a one bit located therebetween, the third run length of zero bits containing the maximum run length of zero bits.

5. An optical disk recording apparatus for recording data formed of successive one bits and zero bits having a run length limited code data format in which at least a predetermined minimum run length of recorded zero bits or at most a predetermined maximum run length of zero bits is located on each side of recorded one bits, said apparatus comprising;
- recording data generating means for generating recording data in accordance with the run length limited code data format, the recording data including a data portion and a fixed pattern data frame used as a synchronous signal, the fixed pattern data frame having plural successive adjacent run lengths of zero bits with respective one bits located between each successive adjacent run lengths of zero bits and having at least two different run lengths of zero bits including at least one of the minimum run length of zero bits and the maximum run length of zero bits, wherein each run length of zero bits in the fixed pattern data frame which is located adjacent a minimum run length of zero bits has a run length which is less than the maximum run length of zero bits, and wherein each run length of zero bits in the fixed pattern data frame which is located adjacent a maximum run length of zero bits has a run length which is more than the minimum run length of zero bits; and,
- recording means for recording the recording data on an optical disk;
- wherein, in the recording data on the optical disk, an initial run length of zero bits of said fixed pattern data frame is immediately preceded by a one bit and a last run length of zero bits of said fixed pattern data frame is immediately followed by a one bit.

6. An apparatus as recited in claim 5, wherein the fixed pattern data frame includes in succession,
- a first run length of zero bits which contains the maximum run length of zero bits, and,
- a second run length of zero bits located adjacent the first run length of zero bits with a one bit located therebetween, the second run length of zero bits containing more than the minimum run length of zero bits and less than the maximum run length of zero bits.

7. An apparatus as recited in claim 5, wherein the fixed pattern data frame includes in succession,
- a first run length of zero bits which contains more than the minimum run length of zero bits and less than the maximum run length of zero bits,
- a second run length of zero bits located adjacent the first run length of zero bits with a one bit located therebetween, the second run length of zero bits containing the maximum run length of zero bits, and,
- a third run length of zero bits located adjacent the second run length of zero bits with a one bit located therebetween, the third run length of zero bit containing more than the minimum run length of zero bits and less than the maximum run length of zero bits.

8. An apparatus as recited in claim 5, wherein the fixed pattern data frame includes in succession,
- a first run length of zero bits which contains the maximum run length of zero bits,
- a second run length of zero bits located adjacent the first run length of zero bits with a one bit located therebetween, the second run length of zero bits containing more than the minimum run length of zero bits and less than the maximum run length of zero bits, and,
- a third run length of zero bits located adjacent the second run length of zero bits with a one located therebetween, the third run length of zero bits containing the maximum run length of zero bits.

* * * * *